Oct. 29, 1929.　　　F. G. PECK　　　1,734,019
METALLIC PACKING
Filed Aug. 25, 1926
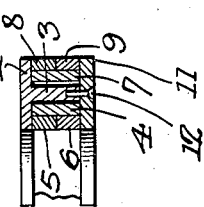
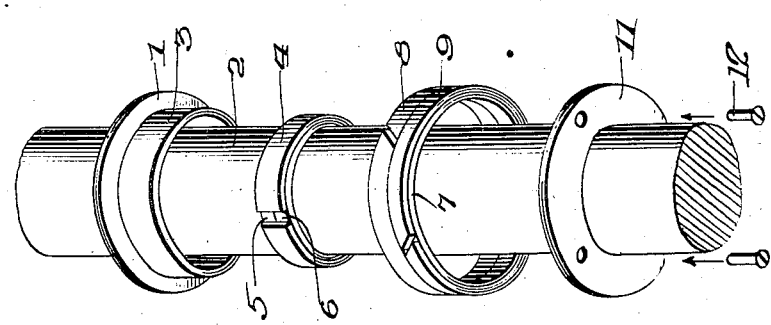
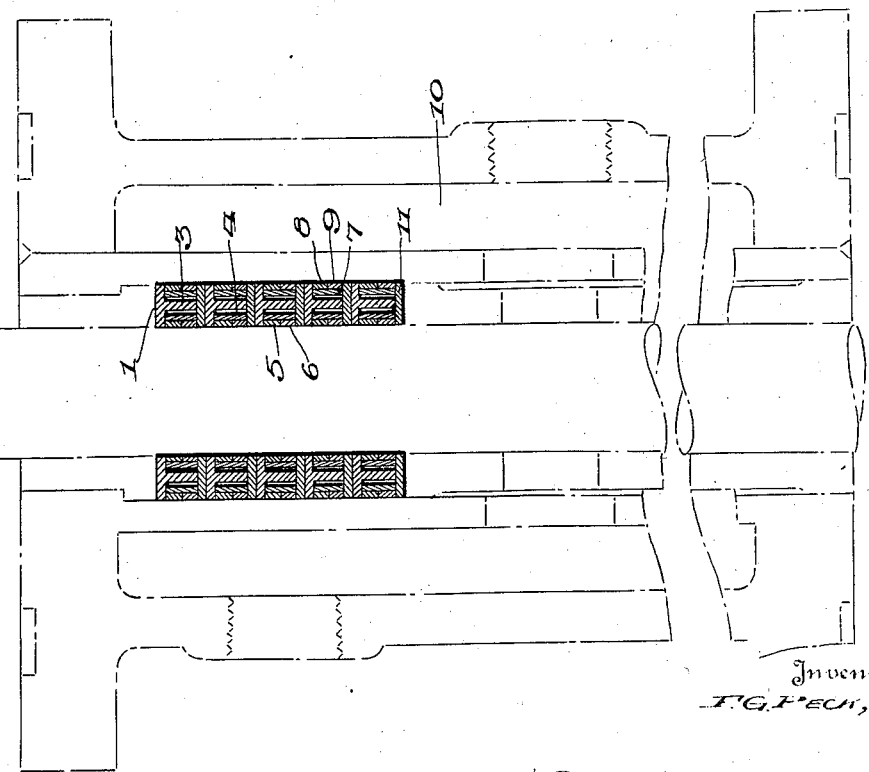
Inventor
F. G. Peck,
By H. P. McElroy
His Attorney Patented Oct. 29, 1929

1,734,019

UNITED STATES PATENT OFFICE

FRED G. PECK, OF PORT ARTHUR, TEXAS, ASSIGNOR TO GULF REFINING COMPANY, OF PITTSBURGH, PENNSYLVANIA, A CORPORATION OF TEXAS

METALLIC PACKING

Application filed August 25, 1926. Serial No. 131,520.

This invention relates to metallic packings, and more specifically to a packing for liquid cooled stuffing boxes such as are used in pressure still pumps. It comprises a metallic packing, advantageously of cast iron, composed of a plurality of independent units each of which consists of a holder in the shape of a ring closely fitting the shaft to be packed, and having an integral flange extending therefrom in a direction axially of the shaft but spaced from it, a split bull ring of a width equal to that of the flange fitted between the flange and shaft and carrying within it a plurality of split packing rings whose combined width is equal to that of the bull ring and flange, the flange having mounted on its outer face a split bull ring which, in turn, carries a plurality of split packing rings, and a follower of ring shape surrounding the shaft and adapted to hold the composite packing structure in assembled position; all as more fully hereinafter set forth and as claimed.

Metallic packing rings have been known and used heretofore but it has been the almost universal custom to make such rings not only as a plurality of interfitting rings, but to make the respective interfitting ring parts as segments, thereby building up a plurality of segments to constitute each ring part of the composite packing ring structure. Rings of this kind are costly to make and laborious to install. The cost of manufacture is increased because of the many parts which must be separately made, and lack of standardization in manufacture due to the different shapes and modes of fastening and interfitting the ring segments. They are difficult to install because of the great number of small parts which must be accurately interfitted to produce the finished structure.

It is accordingly one of the objects of my invention to provide a simple and inexpensive packing structure which can be readily installed in or removed from a stuffing box.

Other and further objects will be apparent from the description and drawing in which Figure 1 is a sectional view taken through a stuffing box and showing a plurality of packing units mounted therein.

Figure 2 is a detail perspective view showing the parts which compose a single packing unit separated, and Figure 3 is an enlarged sectional view through one of the packing units of Figure 1.

Referring more particularly to the drawing:

A holder 1 of ring shape surrounds shaft 2 and has an integral flange 3 extending from it side face in an axial direction but spaced from both the inner and outer edges of the body portion 1. An inner bull ring 4 fits closely within the flange 3 and carries two split packing rings 5 and 6 whose combined width is equal to that of the bull ring. The rings 5 and 6 abut against the shaft 2. Fitted over the flange 3 is a bull ring 7 which carries, on its outer face, two split packing rings 8 and 9 adapted to contact with the inner face of the stuffing box 10. A follower 11 is pinned by pins 12 or is otherwise secured to the holder 1 to thereby provide a unitary structure which can be mounted upon a shaft or removed from it as one piece.

A packing of the foregoing character is particularly adapted to prevent leakage around the rods of pumps handling corrosive material, such as hot oil. The parts, while simple in construction, are so assembled as to provide a tortuous path for any liquid which tends to seep past the packing. The outer surface of the packing unit is substantially continuous, to prevent local accumulation of coke or other reaction products which would injure fibrous packing material, or remove the temper from packings formed of lightly constructed metallic springs.

The bull rings 4 and 7 are equal in width with the flange 3, and are radially aligned therewith. The bull ring 4 encloses the two packing rings 5 and 6 and holds them tightly against the shaft 2, while the bull ring 7 is surrounded by packing rings 8 and 9 and holds them tightly against the inner face of the stuffing box. The bull ring is so constructed and its relation to the adjacent packing rings is such that it will keep the packing rings tight against the rod even after considerable wear of these rings, and the bull ring and packing rings are so proportioned that should any ring break, it will be held in such a position that the reciprocating shaft cannot be seized by the broken end and cause the total destruction of the packing, with consequent great injury to the shaft, and require shutting down of the pump and of the apparatus of which it is an auxiliary.

Although constructed similarly, the function of the outer bull ring and its two packing rings is not identical with that of the inner bull ring and its two packing rings. With the solid head 1 and follower rings 11 it will be evident that any liquid in its effort to pass the packing will be directed either to the face of the reciprocating shaft or to the inside face of the stuffing box. The outer packing rings 8 and 9, with the assistance of their bull ring 7 maintain an extremely tight fit at all times against the inside face of the stuffing box, and any liquid in its effort to pass must take a tortuous path, seeping first between the stuffing box and the outer edge of the holder 1, then between the under face of this holder and the ring 8, then working its way around the edge and inside face of the bull ring 7, then between the follower 11 and the other edge of the bull ring 7 and the packing ring 9, and so on for each unit of packing in the stuffing box. The inner packing rings are held tight against the face of the reciprocating shaft by the bull ring 4 and not only present a tortuous path such as that already described for oil tending to leak along the stuffing box wall, but the edges of the rings 5 and 6 will have a constant wiping effect on the shaft. The bull ring 4, supporting the packing rings 5 and 6, will have the function not alone of holding the packing rings 5 and 6 tight against the adjacent face, as in the case of bull ring 7, but will be required by its contractive force to take up the wear occurring on the rings 5 and 6. The purpose of the ring 11, secured to the holder 1 is to maintain the packing in separate units which can be assembled with care in the shop where they are made, and hold the parts together in their proper relation during transportation to, insertion in, and removal from the point of use.

What I claim is:

1. A metallic packing comprising an annular shaped holder provided with an integral flange extending axially thereof, a bull ring mounted on the inner face of said flange, a plurality of packing rings mounted internally of said bull ring, a bull ring mounted on the outer face of said flange, and a plurality of packing rings mounted on the exterior face of said last-named bull ring, said rings all being held in assembled position by a follower secured to said holder.

2. A metallic packing comprising an annular shaped holder having a flange extending axially thereof, a bull ring mounted on the inner face of said flange, packing carried internally thereof, a bull ring mounted on the outer face of said flange, and packing carried on the outer face of said last-named bull ring.

3. A metallic packing comprising a radially disposed annular metallic member having an axially disposed annular flange thereon between the marginal portions thereof, a ring shaped packing member mounted exteriorly of said flange, a second ring shaped packing member mounted interiorly of said flange, said packing members and said flange being in radial alignment, and a radially extending follower ring secured in juxtaposition to the flange at the end thereof opposite the radially disposed annular member.

4. A metallic packing for shafts comprising a metallic annulus having an axially disposed annular flange between the marginal portions thereof, an annular expanding spring metal split ring mounted upon the outside of said flange, an annular contracting spring split metal ring mounted inside said flange and an additional ring provided with means for securing it to the flange of the annulus to hold the said split rings in position on the flange.

In testimony whereof, I have hereunto affixed my signature.

FRED G. PECK.